US008405361B2

(12) United States Patent
Richards et al.

(10) Patent No.: US 8,405,361 B2
(45) Date of Patent: Mar. 26, 2013

(54) SYSTEM AND METHOD FOR CHARGING A RECHARGEABLE BATTERY (75) Inventors: Anthony M. Richards, Encinitas, CA (US); Charles E. Hardgrove, Imperial Beach, CA (US); William Hugh Molesworth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1414 days.

(21) Appl. No.: 11/859,074

(22) Filed: Sep. 21, 2007

(65) Prior Publication Data

US 2009/0079394 A1   Mar. 26, 2009

(51) Int. Cl.
  *H02J 7/00*   (2006.01)
(52) U.S. Cl. .................. 320/138; 320/132; 320/134
(58) Field of Classification Search .................. 320/125, 320/132, 134, 138
  See application file for complete search history.

(56) References Cited

U.S. PATENT DOCUMENTS

| 6,215,282 | B1 | 4/2001 | Richards et al. |
| 7,253,589 | B1 | 8/2007 | Potanin et al. |
| 7,339,353 | B1 * | 3/2008 | Masias et al. ................. 320/138 |
| 2003/0214303 | A1 * | 11/2003 | Ying .............................. 324/426 |
| 2005/0083017 | A1 * | 4/2005 | Suzuki ........................... 320/128 |
| 2005/0189924 | A1 | 9/2005 | Nagai et al. |
| 2005/0253560 | A1 * | 11/2005 | Popescu-Stanesti et al. . 320/138 |
| 2007/0216361 | A1 | 9/2007 | Zelinski et al. |

FOREIGN PATENT DOCUMENTS

| EP | 1455194 A1 | 9/2004 |
| FR | 2896211 A1 | 7/2007 |

OTHER PUBLICATIONS

International Search Report and Written Opinion—PCT/US2008/076505—ISA/EPO—Mar. 27, 2009.

* cited by examiner

*Primary Examiner* — Edward Tso
*Assistant Examiner* — Aaron Piggush (57) ABSTRACT The present invention includes a system and method of charging a rechargeable battery. The system can further include a processor that is adapted to control one of the high power charger or the low power charger to charge the battery in response to the high power input voltage relative to a predetermined high power voltage value and the low power input voltage relative to a predetermined low power voltage value. The method can include the steps of determining a high power input voltage of the high power source, determining a low power input voltage of the low power source, causing a high power charger to charge the battery in response to a sufficient high power input voltage, and causing a low power charger to charge the battery in response to an insufficient high power input voltage and a sufficient low power input voltage.

32 Claims, 8 Drawing Sheets

SYSTEM AND METHOD FOR CHARGING A RECHARGEABLE BATTERY

FIELD OF THE PRESENT INVENTION

The present invention relates generally to a system and method of charging a rechargeable battery, and in particular to a system and method of charging a rechargeable battery from one or more of a low power source and a high power source.

BACKGROUND OF THE PRESENT INVENTION

Along with increased computing power, portability has-been an important hallmark of the electronic age. Some electronic products today are manufactured in handheld packages, where the same component in past years occupied an entire room. Such portability would be meaningless without the availability of similarly portable power supplies, so it is no surprise that batteries have also undergone significant development in storage capability, compactness, and other features.

Many portable electronic devices utilize rechargeable batteries, such as for example sealed lead acid (SLA) batteries. Rechargeable batteries provide a number of advantages over their disposable counterparts, not the least of which significantly increased savings to the user by not having to regularly replace spent batteries with expensive new batteries. Moreover, the use of rechargeable batteries also significantly reduces the disposal of batteries, which often times contain heavy elements that can he safely disposed of without significant cost and/or environmental impact. Rechargeable batteries do have some limitations; however. In particular, it is not uncommon for a rechargeable battery to become either over- or undercharged during a recharging phase due to insufficient control of the recharging process. Over-or undercharged batteries will oftentimes lose their capacity in short order, and thus require replacement which again introduces significant costs in acquiring the new battery and disposing of the old battery.

Rechargeable batteries are particularly prone to over-or undercharging in systems in which there is both a high, power and a low power charger. To date, no appropriate system or method of recharging a battery using high power and low power sources has been developed. For example, a simple approach currently employed is to diode "OR" the high and low power inputs together and regulate the temperature compensated charge voltage to the recommended float voltage. This approach does not use a processor and requires long charge times to properly fully charge the battery pack. In the many circumstances, it is often the case that the input power sources are not available for charging for long periods and therefore the battery would typically be undercharged. If the battery is in a cyclic discharge profile repeated undercharges will cause a rapid loss in battery capacity.

Another current approach is to "OR" the high and low power Inputs together and use a microcontroller to control two different charger states. Typically either a minimum charge current or a timer is used to transition from one charge state to the next. This approach can work well given a fixed input power source, hut can often lead to overcharging if the source can supply more current than expected if the algorithm is timer based. On the other hand, it can lead to undercharging if the input power source provides less current then expected and the algorithm requires a minimum charge current to transition to the next charger state.

Accordingly, there is a need in the art for a system and method of charging a rechargeable battery using one of a high power or low power charger that is adapted to minimize the risk of under-or overcharging the battery. Such a desirable system and method would greatly extend battery performance when in use and significantly extend the life of the rechargeable battery, thereby reducing the overall costs to the user.

SUMMARY OF THE PRESENT INVENTION

The present invention provides a solution to the foregoing problems in the system and method of charging a rechargeable battery using one of a high power or low power charger. In particular, the present invention includes a system for charging a rechargeable battery. The system can include a high power charger connected to a battery and a low power charger connected to the battery. The system can further include a high power source defining a high power input voltage and a low power source defining a low power input voltage. The high power source can he connected to the high power charger and the low power source is connected to the low power charger. The system can further include a processor connected to the high power charger, the low power charger, the high power source and the low power source. In one embodiment of the system, the processor is adapted to control one of the high power charger or the low power charger to charge the battery in response to the high power input voltage relative to a predetermined high power voltage value and the low power input voltage relative to a predetermined low power voltage value.

The present invention further includes a method for charging a rechargeable battery. The method can include the steps of determining a high power input voltage of the high power source, determining a low power input voltage of the low power source, causing a high power charger to charge the battery in response to a sufficient high power input voltage, and causing a low power charger to charge the battery in response to an insufficient high power input voltage and a sufficient low power input voltage.

In both the system and method of the present invention, the high power source can include for example a vehicle power system, including elements such as a vehicle battery, which can be either a static charge battery or a more complex battery system that is recharged during operation of the vehicle through an alternator or other electrical regeneration system such as those found in hybrid vehicles. The low power source can include for example a solar power source, a motion induced power source or a piezoelectric power source. The battery can include any type of rechargeable battery, such as for example a lithium ion battery or sealed lead acid (SLA) battery. Variations of the system and method of the present invention can include steps and/or means for recharging more than one battery using one or more pairs of high power and low power chargers. In other variations, a single charger can be used as both the low power and high power charger.

Further aspects, details and advantages of the system and method of the present invention are described in detail below with reference to the following Figures.

DETAILED DESCRIPTION OF THE PREFERRED EMBODIMENTS

The present invention includes a system and methods for charging a rechargeable battery. Although the present invention is described below with references to certain preferred embodiments and variations thereof it should be understood that the scope of the present invention should be determined with reference to the appended claims.

The system and methods of the present invention can be employed in a number of operating environments, including in particular those having more than one power source. In one example environment, a low power charger and a high power charger are used in a complimentary fashion to power one or more devices. For example, many companies utilize fleet vehicle management systems that include a number of peripherals for tracking and communicating with the fleet vehicles. Example peripherals can include satellite modems, driver interface units, cellular and/or satellite communications devices, global positioning system (GPS) and/or Galileo-type positioning systems, and the like. Each of these peripherals can receive electrical power from a rechargeable battery, which can be recharged by one or more power sources, such as the vehicle power system, solar power systems, motion induced power systems or piezoelectric power systems. The present invention is well suited for operation in this example environment, although as described below, it is also well suited for operation in any other environments in which a rechargeable battery is used for powering one or more peripherals.

Figure 1:
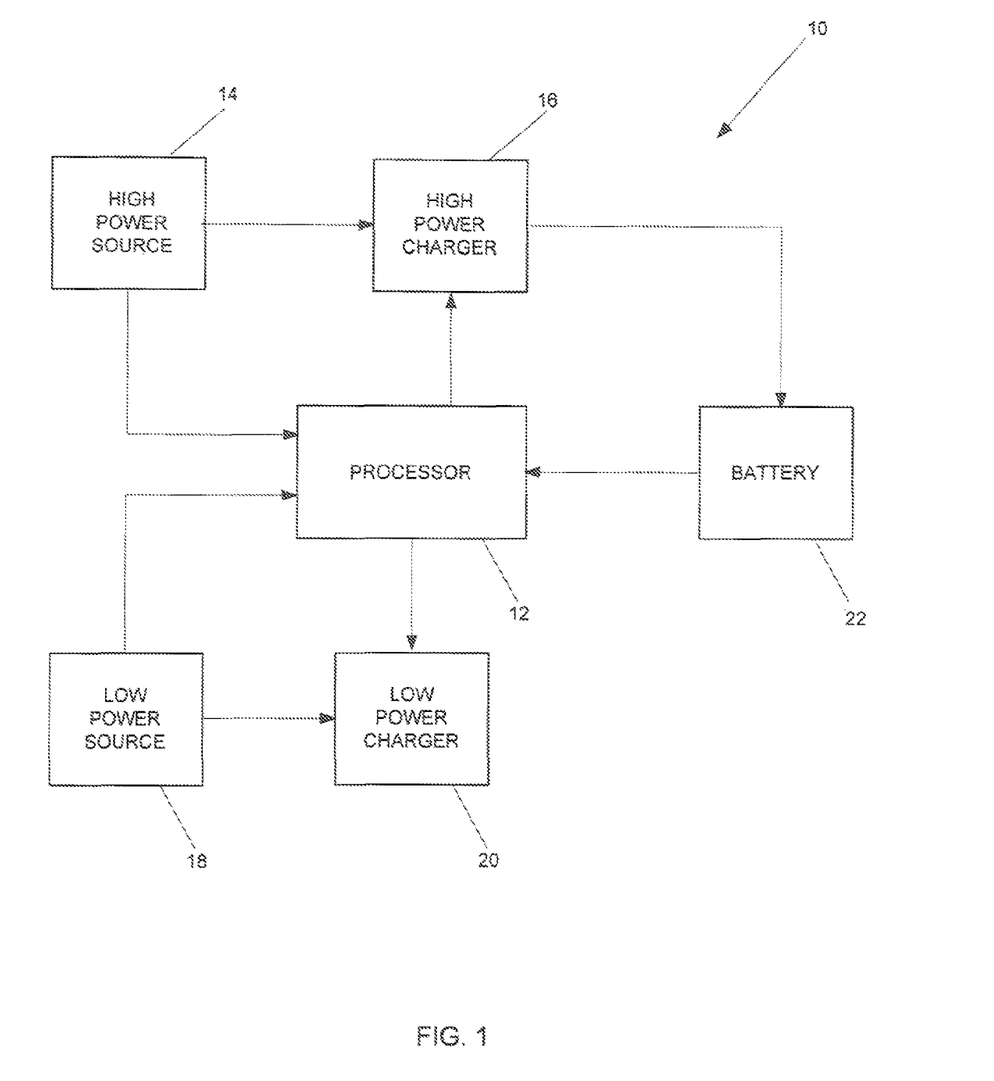
FIG. 1 is a schematic block diagram of a system for charging a rechargeable battery in accordance with a preferred embodiment of the present invention.

The invention includes a system for charging a rechargeable battery. In the system of the preferred embodiment shown in FIG. 1, system 10 includes a high power charger 16 connected to a battery 22 and a low power charger 20 connected to battery 22. System 10 of the preferred embodiment further includes a high power source 14 defining a high power input voltage and a low power source 18 defining a low power input voltage. As shown in FIG. 1, high power source 14 is connected to high power charger 16 and the low power source is connected to low power charger 20. System 10 of the preferred embodiment further includes a processor 12 connected to high power charger 16, low power charger 20, high power source 14 and low power source 18. In system 10 of the preferred embodiment, processor 12 is adapted to control one of high power charger 16 or low power charger 20, to charge a battery 22 in response to the high power input voltage relative to a predetermined high power voltage value and the low power input voltage relative to a predetermined low power voltage value. As described in more detail below, processor 12 can be adapted to select high power charger 16 to charge battery 22 in response to the high power input voltage exceeding the predetermined high power voltage value.

In variations of system 10 of the preferred embodiment, high power source 14 can include for example a vehicle power system, including elements such as a vehicle battery, which can be either a static charge battery or a more complex battery system that is recharged during operation of the vehicle through an alternator or other electrical regeneration system such as those found in hybrid vehicles. As such, a suitable predetermined high power voltage value is one the order of 9V, or approximately greater than or equal to 9.37V. Low power source 18 can include, for example, a solar power source, a motion induced power source or a piezoelectric power source. A suitable predetermined, low power voltage value is on the order of 4.5-5V, or approximately greater than or equal to 5V. Battery 22 can include any type of rechargeable battery, such as for example a lithium ion battery or sealed lead acid (SLA) battery. Other variations of system 10 can include more than one battery 22, each having its own set of high and low power chargers or each being connected and charged by a single pair of high and low power chargers.

In system 10 of the preferred embodiment, processor 12 can be adapted to control high power charger 16 to charge battery 22 according to a predetermined high power algorithm. One suitable high power algorithm is disclosed in U.S. Pat. No. 6,215,282, assigned to the assignee of the present invention and incorporated herein by reference. The predetermined high power algorithm can include a number of steps for controlling high power charger 16, for example setting high power charger 16 to a fast charge state and ending the fast charge state in response to a charger current value being less than a minimum current value. Additionally, the high power algorithm can include the steps of setting high power charger 16 to an overcharge state in response to the charger current value decreasing below the minimum current value and setting high power charger 16 to a float charge state in response to one of ending the fast charge state or the overcharge state. A more detailed description of the high power algorithm can be found below with reference to FIG. 7.

Similarly, in system 10 of the preferred embodiment, processor 12 can he adapted to control low power charger 20 to charge battery 22 according to a predetermined low power algorithm. The predetermined low power algorithm can include steps for controlling low power charger 20, for example setting low power charger 20 to a fast charge state and determining a charge rate in response to a previous charging routine. The low power algorithm can also include steps such as ending the fast charge state in response to an amp-hours-out of battery 22 being replaced by an amp-hours-in provided by low power charger 20. As used herein, the term amp-hours-out is defined as an aggregate of the amp-hours provided by the battery to one or more peripherals. Alternatively, the amp-hours-out of the battery can further include a prior aggregation of the amp-hours provided by battery 22 to the one or more peripherals, which allows low power charger 20 to begin its charging at an intermediate charge state of the battery in order to avoid under-or overcharging battery 22. A more detailed description of the low power algorithm can be found below with reference to FIG. 6.

In another variation of system 10 of the preferred embodiment, processor 12 is further adapted to select low power charger 20 to charge battery 22 in response to high power source 14 being disconnected from battery 22 during a charging phase. As noted above, in order to prevent inadvertent under- or overcharging of battery 22, processor 12 can control low power charger 20 to resume and/or begin charging battery 22 from an Intermediate charge state of battery 22.

One suitable scenario for determining the amp-hours-out of battery 22 is to measure the amp-hours-out during a discharge state. As used herein, the term discharge includes any and all instances in which battery 22 is supplying power to the one or more peripherals, or instances in which the battery is dormant but nevertheless sleeping current through the normal chemical reactions of battery 22. In another variation of system 10 of the preferred embodiment, processor 12 is further adapted to transition through tire discharge state in response to a transition between controlling high power charger 16 to charge the battery and controlling low power charger 20 to charge battery 22. In order to maintain the charging history of battery 22, processor 12 can be further adapted to accumulate the amp-hours-in to battery 22 at low power charger 20 and calculate an aggregate of the amp-hours-out provided by battery 22 to one or more peripherals. Moreover, processor 12 can be adapted to determine a battery capacity in response to the aggregate of the amp-hours-out, whereby a fast charge required can be determined in response to the battery capacity.

Table 1 shown below is illustrative of some default current values for some suitable peripherals that can be operated in conjunction with system 10 of the preferred embodiment.

TABLE 1

| Peripheral | Default |
|---|---|
| GPS | 50 mA |
| micro-controller #1 | 50 mA |
| micro-controller #2 | 1 mA |
| Phone | 20 mA |
| Sensor | 25 mA |

Processor 12 can also be adapted to measure and capture the peak minimum voltage of battery 22 at low power charger 20 during each wake event. Processor 12 can use the peak minimum voltage value to estimate the battery capacity using a look-up table, such as the one shown below in Table 2.

TABLE 2

| Aux Batt Volts | Temperature in ° C. | | | | | |
|---|---|---|---|---|---|---|
| | −49 to −25 2250 mAH | −24 to −5 3150 mAH | −4 to +15 3825 mAH | +16 to +35 4500 mAH | +36 to +55 4500 mAH | >+56 4500 mAH |
| 3.550 | 0% | 0% | 0% | 0% | 0% | 0% |
| 3.600 | 15% | 10% | 10% | 10% | 10% | 10% |
| 3.650 | 25% | 20% | 20% | 15% | 15% | 15% |
| 3.675 | 35% | 25% | 25% | 20% | 20% | 20% |
| 3.700 | 45% | 30% | 30% | 25% | 25% | 25% |
| 3.725 | 55% | 35% | 35% | 30% | 30% | 30% |
| 3.750 | 65% | 40% | 40% | 35% | 35% | 35% |
| 3.850 | 90% | 75% | 60% | 55% | 55% | 55% |
| 3.950 | 100% | 95% | 85% | 75% | 75% | 75% |
| 4.000 | 100% | 100% | 95% | 85% | 85% | 85% |
| 4.025 | 100% | 100% | 100% | 90% | 90% | 90% |
| 4.050 | 100% | 100% | 100% | 95% | 95% | 95% |
| 4.100 | 100% | 100% | 100% | 100% | 100% | 100% |

In cases in which battery 22 has been replaced, first installed, or if there is a malfunction erasing the history of the amp-hours-out, processor 12 may not be able to appropriately determine the battery capacity. In such instances, processor 12 can employ a look-up table that factors in the aggregate amp-hours-out as well as the ambient temperature of battery 22. Processor 12 can be further adapted to ensure that the fast charge required value exceeds the accumulated amp-hours-out by more than a predetermined value, such as approximately 20%. Alternatively, if battery 22 is awakening from a hibernation event or newly replaced, processor 12 can cause the fast charge value to exceed the accumulated amp-hours-out by more than the predetermined value. When processor 12 controls low power charger 20 to enter a fast charge state, it compares the accumulated amp-hours-out to the battery capacity (%) shown above. The fast charge required for the fast charge state can then be established as the greater of the two aforementioned values.

System 10 of the preferred embodiment and its several variations can be readily adapted to perform the method of the present invention, which is described herein with reference to FIGS. 2 through 8. The method of the preferred embodiment includes the steps of determining a high power input voltage of the high power source, determining a low power input voltage of the low power source, causing a high power charger to charge the battery in response to a sufficient high power input voltage, and causing a low power charger to charge the battery in response to an insufficient high power input voltage and a sufficient low power input voltage. As noted above, the high power source can include for example a vehicle power system, including elements such as a vehicle battery, which can be either a static charge battery or a more complex battery system that is recharged during operation of the vehicle through an alternator or other electrical regeneration system such as those found in hybrid vehicles. As such, a suitable predetermined high power voltage value is one the order of 9V, or approximately greater than or equal to 9.37V. The low power source can include for example a solar power source, a motion induced power source or a piezoelectric power source. A suitable predetermined low power voltage value is on the order of 4.5-5V, or approximately greater than or equal to 5V. The battery can include any type of rechargeable battery, such as for example a lithium ion battery or sealed lead acid (SLA) battery. Variations of the method of the preferred embodiment can include steps for recharging more than one battery using one or more pairs of high power and low power chargers.

In one variation of the method of the preferred embodiment, the method further includes the step of causing the high power charger to charge the battery according to a predetermined high power algorithm. The high power algorithm can include a number of steps, for example setting the high power charger to a fast charge state and ending the fast charge state in response to a charger current value being less than a minimum current value. Additionally, the high power algorithm can include the steps of setting the high power charger to an overcharge state in response to the charger current value exceeding the minimum current value and setting the high power charger to a float charge state in response to one of ending the fast charge state or the overcharge state. A more detailed description of the high power algorithm can be found below with reference to FIG. 7.

Similarly, another variation of method of the preferred embodiment can include the step of causing the low power charger to charge the battery according to a low power algorithm. The predetermined low power algorithm can include steps for controlling the low power charger, for example setting the low power charger to a fast charge state and determining a charge rate in response to a previous charging routine. The low power algorithm can also include steps such as ending the fast charge state in response to an amp-hours-out of the battery being replaced by an amp-hours-in provided by the low power charger. As used herein, the term amp-hours-out is defined as an aggregate of the amp-hours provided by the battery to one or more peripherals. Alternatively, the amp-hours-out of the battery can further include a prior aggregation of the amp-hours provided by the battery to the one or more peripherals, which allows the low power charger to begin its charging at an intermediate charge state of the battery in order to avoid under- or overcharging the battery. A more detailed description of the low power algorithm can be found below with reference to FIG. 6.

Another variation of the method of the preferred embodiment includes the step of causing the low power charger to charge the battery in response to the high power source being disconnected from the battery during a charging phase. As noted above, in order to prevent inadvertent under or overcharging of the battery, the low power charger can be controlled or caused to resume and/or begin charging the battery from an intermediate charge state of the battery.

One suitable scenario for determining the amp-hours-out of the battery is to measure the amp-hours-out during a discharge state. As used herein, the term discharge includes any and all instances in which the battery is supplying power to the one or more peripherals, or instances in which the battery is dormant but nevertheless seeping current through the normal chemical reactions of the battery, in order to maintain the charging history of the battery, the method can include the steps of accumulating the amp-hours-out of the battery at the low power charger and calculating an aggregate of the amp-hours-out provided by the battery to one or more peripherals. Moreover, the method can include the steps of determining a battery capacity in response to the aggregate of the amp-hours-out, whereby a fast charge required can be determined in response to the battery capacity.

As noted above in Tables 1 and 2, the steps of measuring the accumulated amp-hours-out of the battery and determining the battery capacity allow the method to properly select the rate of charge in the fast charge state such that the risk of under- or overcharging the battery is sufficiently minimized.

Figure 2:
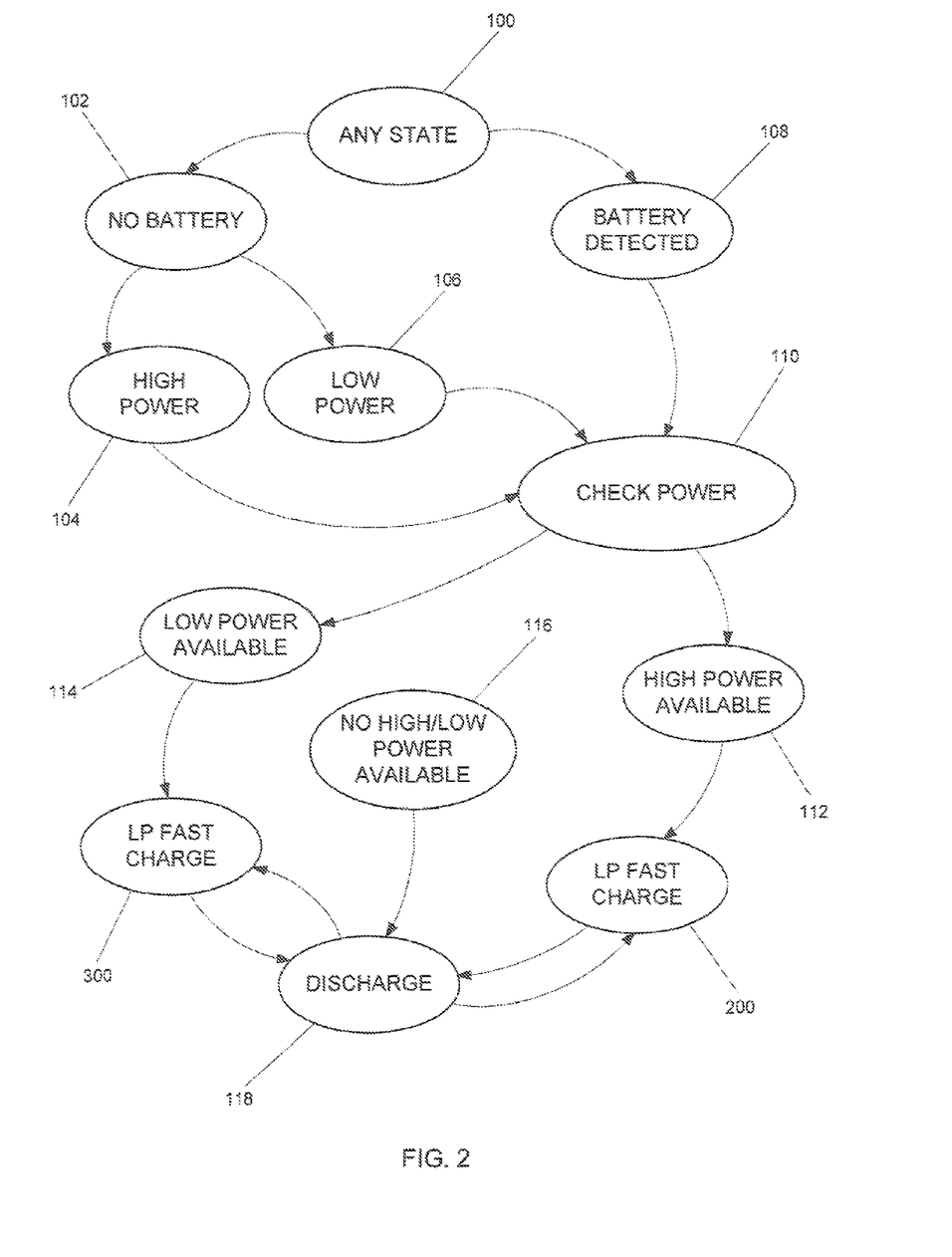
FIG. 2 is a state diagram of a method for charging a rechargeable battery in accordance with a variation of the preferred embodiment of the present invention.
Figure 3:
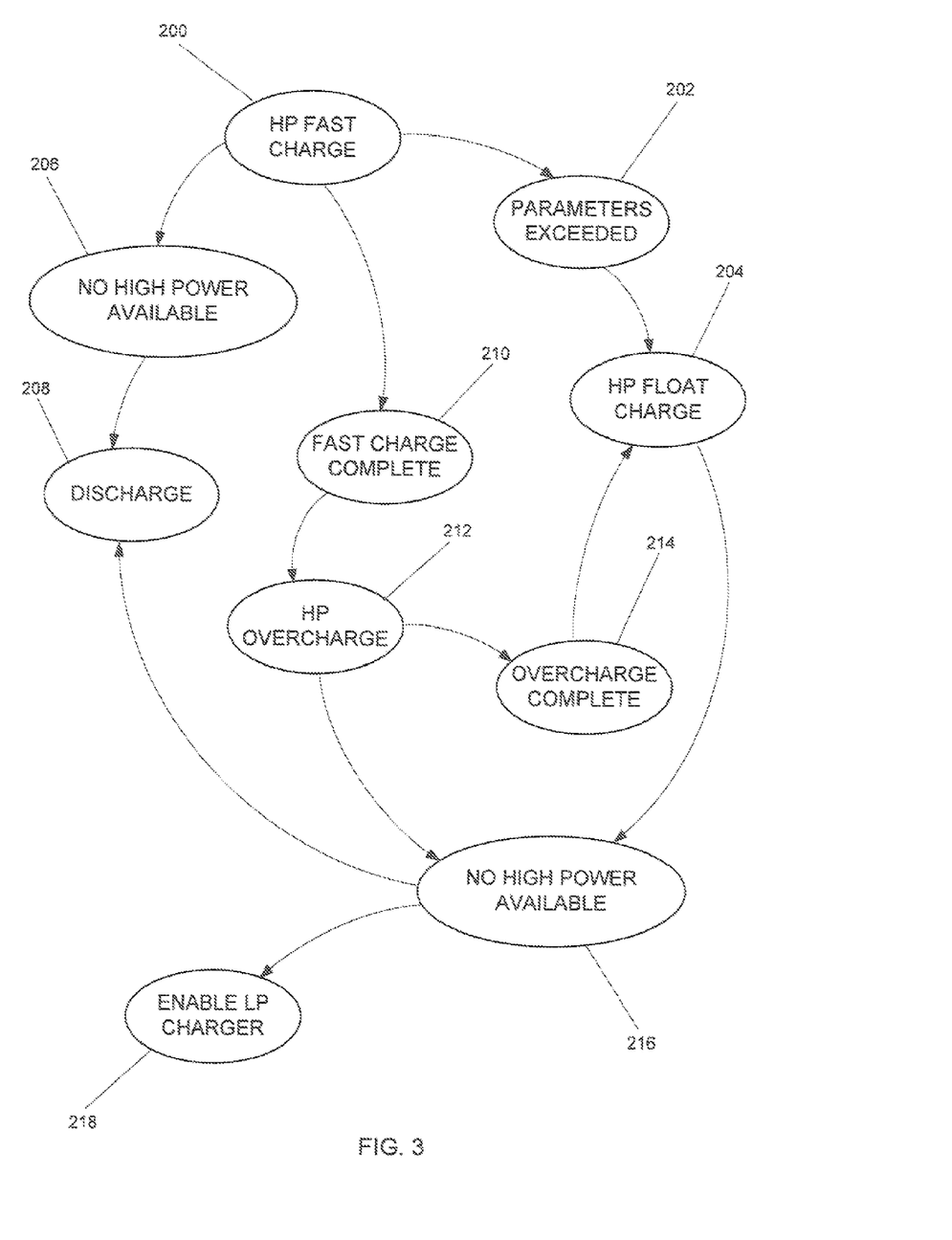
FIG. 3 is a state diagram of a method for charging a rechargeable battery with a high power charger in accordance with another variation of the preferred embodiment of the present invention.
Figure 4:
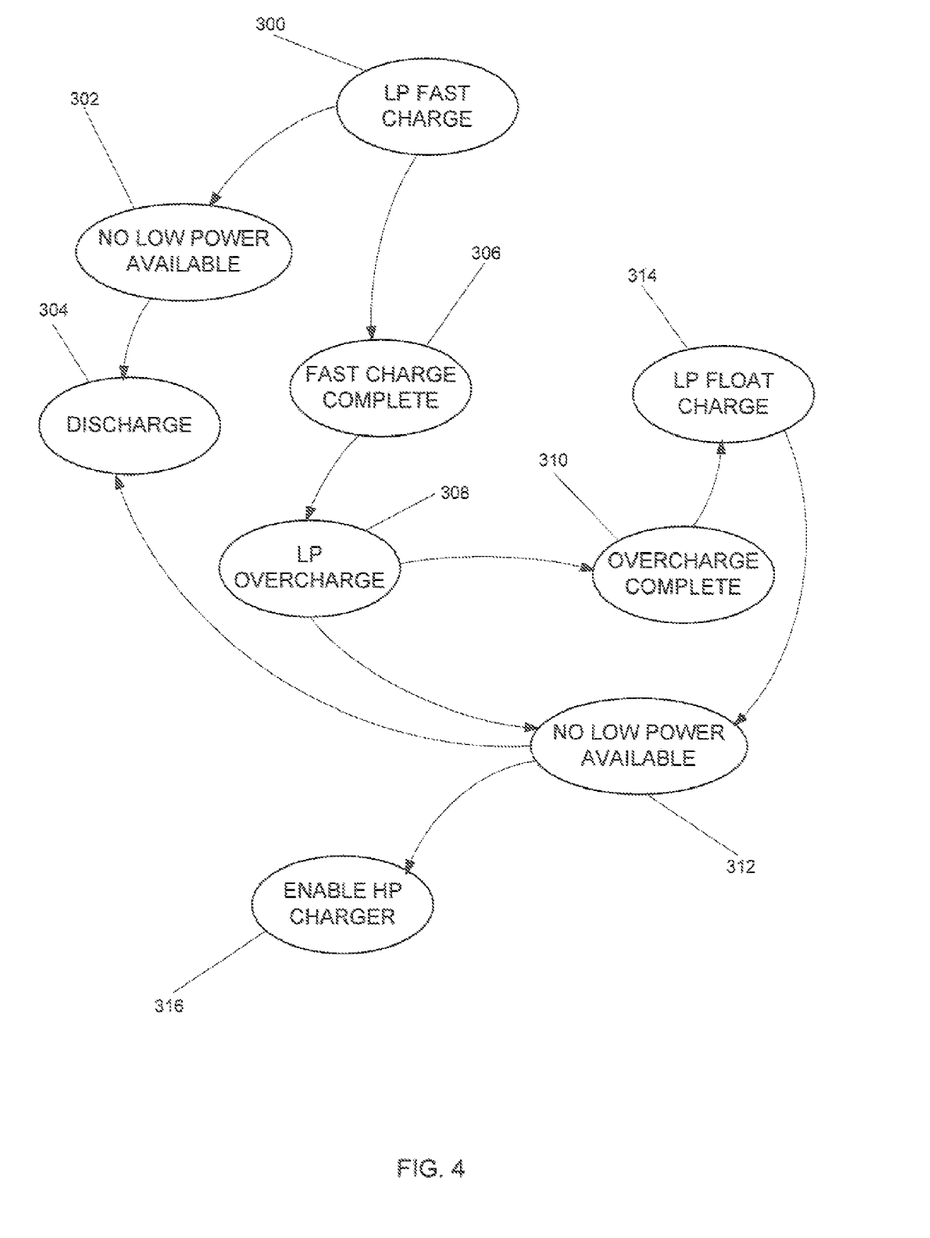
FIG. 4 is a state diagram of a method for charging a rechargeable battery with a low power charger in accordance with another variation of the preferred embodiment of the present invention.

The system and method of the present invention can be further illustrated with reference to the state diagrams of FIGS. 2, 3, and 4. FIG. 2 illustrates a high-level state diagram that can be used to control the operation of the system or performance of the methods associated therewith. Although described herein with reference to the method of the preferred embodiment, the state diagrams of FIGS. 2, 3, and 4 are equally applicable to system 10 of the preferred embodiment.

State 100 is defined as any state, which can include any state of power and/or charging within method of the preferred embodiment and its variations. For example, in any state 100 that battery can be fully charged, partially charged, newly installed, or recently awakened from a hibernation state. From any state 100, the method queries as to the battery status, which can be either no battery 102 or battery detected 108. If there is no battery 102, then the method proceeds to high power source 104 and low power source 106, and checks the power, i.e. voltage input, of each of the sources in state 110. Similarly, if a battery is detected in state 108, then the method proceeds to check the power/voltage supply of the battery, the high power source and the low power source.

If the low power source is available in state 114, then the method can use the low power charger to execute a low power fast charge of the battery in state 300. If the high power source is available, then the method can use the high power charger to execute a high power charge of the battery in state 200. As noted above, the method of the preferred embodiment includes the steps of causing a high power charger to charge the battery in response to a sufficient high power input voltage, and causing a low power charger to charge the battery in response to an insufficient high power input voltage and a sufficient low power input voltage. A suitable predetermined high power voltage value is one the order of 9V, or approximately greater than or equal to 9.37V. A suitable predetermined low power voltage value is on the order of 4.5-5V, or approximately greater than or equal to 5V.

Upon completion of low power fast charge state 300 or high power fast charge state 200, the method can transition through discharge state 118 to determine the required over charge time and then transition to Over Charge state (212 or 308). As noted above, the term discharge is defined broadly to include any and all instances, in which the battery is supplying power to the one or more peripherals, or instances in which the battery is dormant but nevertheless sleeping current through the normal chemical reactions of the battery. If no high, or low power source is available in state 116, then the method proceeds to state 118, in which the battery is discharged unless and until one of the low or high power source is available to recharge the battery.

FIG. 3 is a state diagram illustrating a methodology of the high power fast charge state 206 in accordance with another variation of the method of the preferred embodiment. As noted above, high power fast charge state 200 can be performed according to a high power algorithm, in which the high power fast charge is ended in response to a charger current value being less than a minimum current value. The high power algorithm can also include the steps of setting the high power charger to an overcharge state in response to the fast charge state being completed. This occurs when the charger current decreases below the minimum current value. The high power charger transitions to a float charge state in response to one of ending the overcharge state or if a maximum fast charge time is exceeded.

As shown in FIG. 3, if predetermined parameters are exceeded in state 202, then this variation of the method can proceed to high power float charge state 204. If the high power fast charge is otherwise completed in state 210, then the method can proceed to high power overcharge state 212. Upon completion of the high power overcharge in state 214, the method can proceed to high power float charge state 204. In the event that the high power source is unavailable, as in states 206 and 216, then the method can proceed to a discharge state 208 and/or attempt to enable the low power charger in state 218. As an example, the high power source can become unavailable if the high power input voltage is insufficient, i.e., below a predetermined threshold, in which case the battery will be used to power the one or more peripherals in discharge state 208. Alternatively, if the high power source is unavailable but the low power source has a sufficient low power input voltage, then this example method can enable the low power charger to charge the battery.

FIG. 4 is a state diagram illustrating an example method of utilizing the low power charger to charge the battery. The low power fast charge is entered in state 300, and is completed in state 306. The low power fast charge process includes setting the low power charger to a fast charge state and determining a charge rate in response to a previous charging routine. The low power fast charge is complete in state 306 in response to an amp-hours-out of the battery being replaced by an amp-hours-in provided by the low power charger. Upon completion of the low power last charge, the example method proceeds to a low power overcharge state 308, which is completed in state 310, wherein the method can proceed to the low power float charge in state 314.

If the low power source is unavailable in state 312, then both of the low power overcharge state 308 and the low power float charge state 314 are ended and the method proceeds to determine if the high power source can be used for recharging the battery in state 316. If the high power source is unavailable and if the low power source is unavailable, then the battery will be discharged in state 304. The discharge state 304 can include using the battery to power one or more peripherals. As noted above, when the battery is in a discharge state 304, variations of the system and method of the preferred embodiment will cause the low power charger to accumulate the amp-hours-out of the battery in order to maintain a charge history of the battery and to more accurately determine a battery capacity as set forth in Tables 1 and 2.

Figure 5:
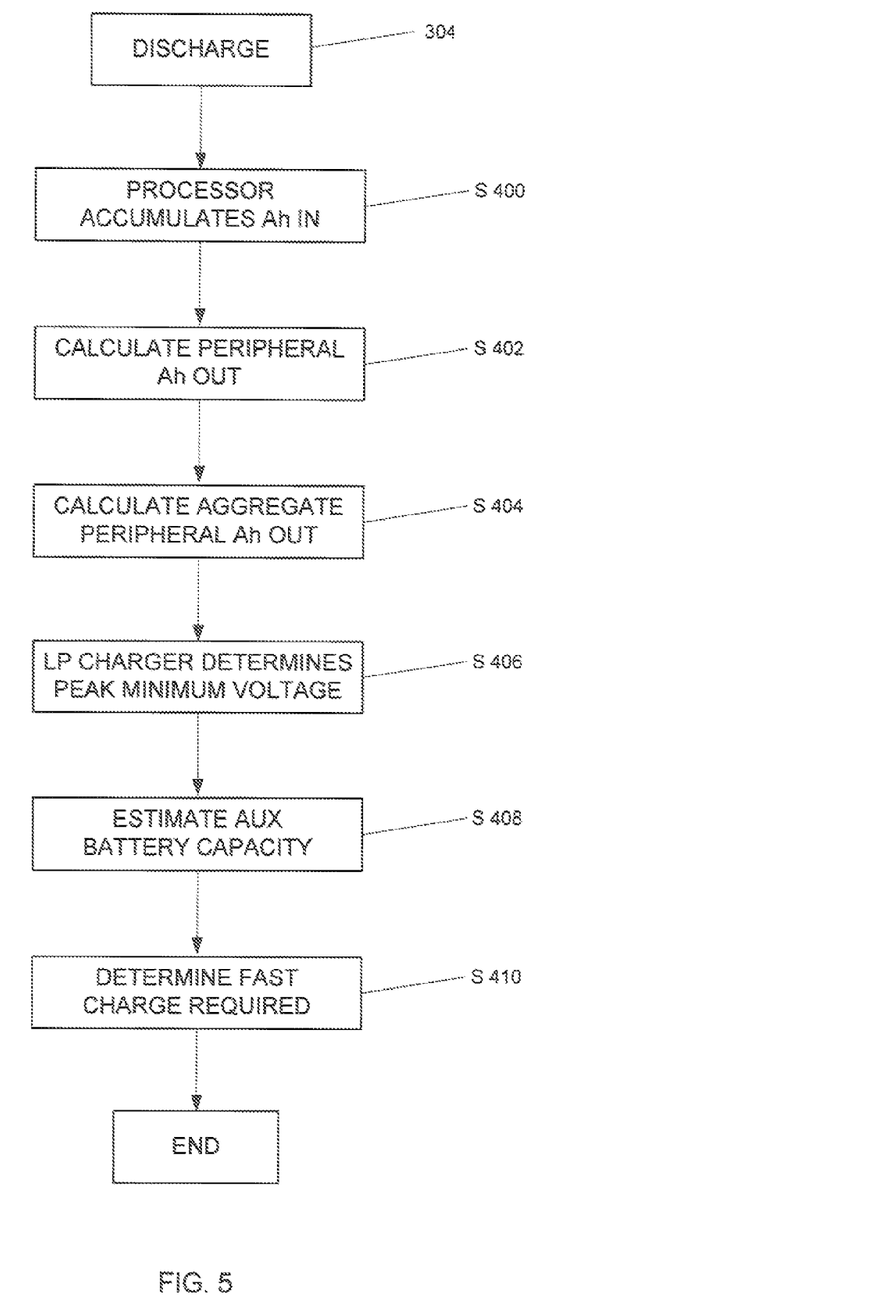
FIG. 5 is a flow chart depleting a method for estimating the discharge of a rechargeable battery in accordance with another variation of the preferred embodiment of the present invention.

FIG. 5 is a flow chart illustrating an example method for determining the fast charge required for the battery after the battery has been placed into a discharge state 304. In step S 400, the low power charger accumulates the amp-hours-in to the battery. In step S 402, the method recites calculating the peripheral amp-hours-out, some example values for which are shown above in Table 1. In step S 404, the method recites calculating the aggregate peripheral amp-hours-out, which is the sum of the amp-hours consumed by each peripheral that is powered by the battery during the discharge state. In step S 406, the processor determines the peak minimum voltage of the battery, which in combination with other factors can be used to estimate the auxiliary battery capacity in step S 408. As noted above, the look-up table shown in Table 2 can be utilized by a processor performing this example method in order to estimate the auxiliary battery capacity. In response to the estimate of the auxiliary battery capacity, the method recites determining the fast charge required in step S 410.

The fast charge required is used according to the system and method of the present invention as a portion of the charging history of the battery. In variations of the preferred embodiments, the fast charge required is used to ensure that either the low power or high power charger does not inadvertently under- or overcharge the battery by prematurely terminating or extending the fast charge state of either charger.

Figure 6:
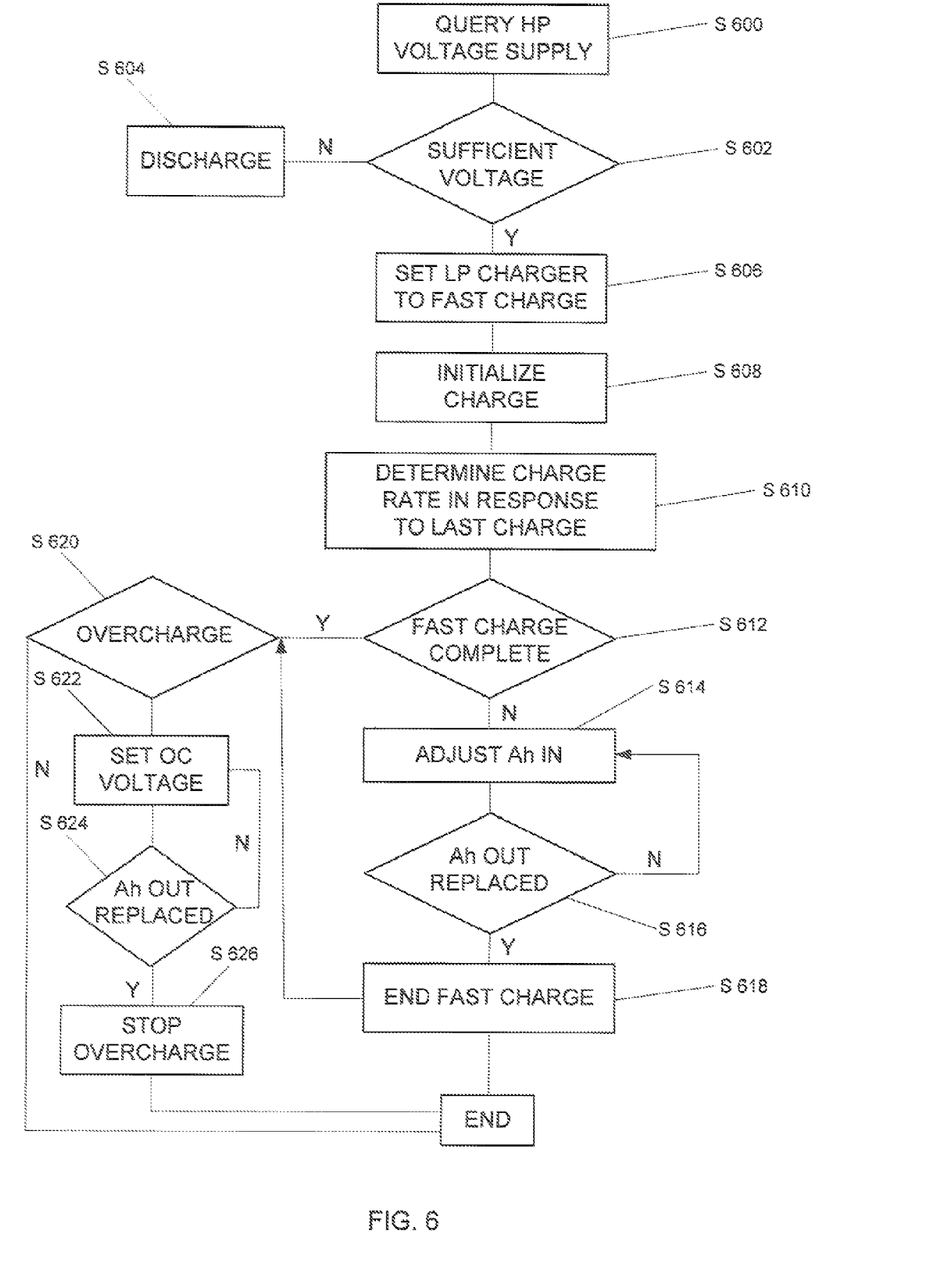
FIG. 6 is a flow chart depicting a method for charging a rechargeable battery using a low power charger in accordance with another variation of the preferred embodiment of the present invention.

An example method of charging the battery using the low power charger is shown in the flow chart of FIG. 6. In step S 600, the example method recites querying the low power voltage supply. As previously noted, a suitable low power voltage value is on the order of 4.5-5V, or approximately greater than or equal to 5V. In decision block S 602, if the voltage supply is insufficient then the example method proceeds to a discharge step in step S 604. If the voltage supply is sufficient, then the example method proceeds to set the low power charger to a fast charge state in step S 606. In step S 608, the fast charge is initialized, causing the low power charger to begin charging the battery.

In step S 610, the example method recites determining a charge rate in response to the last/previous charge. As noted above with respect to FIG. 5, the fast charge required is calculated as a function of the battery capacity, which in turn is calculated as a function of the aggregate amp-hours-out to the one or more peripherals and the peak minimum voltage of the battery, determined as set forth above. The charge rate determines how much charge the low power charger will provide to the battery, and it can be a steady state or variable charge rate, depending on the particular application.

In decision block S 612, the example method queries as to whether the fast charge is complete. If the fast charge is complete, then the example method proceeds to decision block S 620, in which it queries whether an overcharge state is required. If the overcharge is not required, then the example method of FIG. 6 terminates. If the overcharge is required, men the low power charger is set to an overcharge voltage in step S 622. In decision block S 624, the example method queries whether the amp-hours-out of the battery have been replaced by the overcharge state set at the overcharge voltage. If the amp-hours-out have been replaced, then the overcharge is stopped in step S 626 and the example method is terminated. If the amp-hours-out have not been replaced by the overcharge state, then the example method proceeds hack to step S 622, in which the overcharge voltage is continued in order to provide the current necessary to replace the amp-hours-out of the battery.

If, in decision block S 612, the example method determines that the fast charge is not complete, then m step S 614 the example method adjusts the amp-hours-in to the battery. In adjusting the amp-hours-in, the example method can consider for example the current being supplied by the low power source as it compares to the amp-hours being consumed by the one or more peripherals. If the current from the low power source is greater than the amp-hours-out, then the battery should he accumulating charge. If the current from the low power source is less man the amp-hours-out, then the battery will not he accumulating charge and the example method will adjust the amp-hours-in in order to exceed those consumed by the one or more peripherals.

In decision block S 616, the example method queries whether the amp-hours-out have been replaced by the amp-hours-in set in step S 614. If the decision is affirmative, then the method proceeds to step S 618 in which the fast charge is ended. Following the step of ending the fast charge, the example method can proceed into either an overcharge state through step S 620 or the example method can terminate. If the decision at step S 616 is negative, then the example method returns to step S 614, in which the amp-hours-in continue to accumulate until the amp-hours-out have been replaced.

Figure 7:
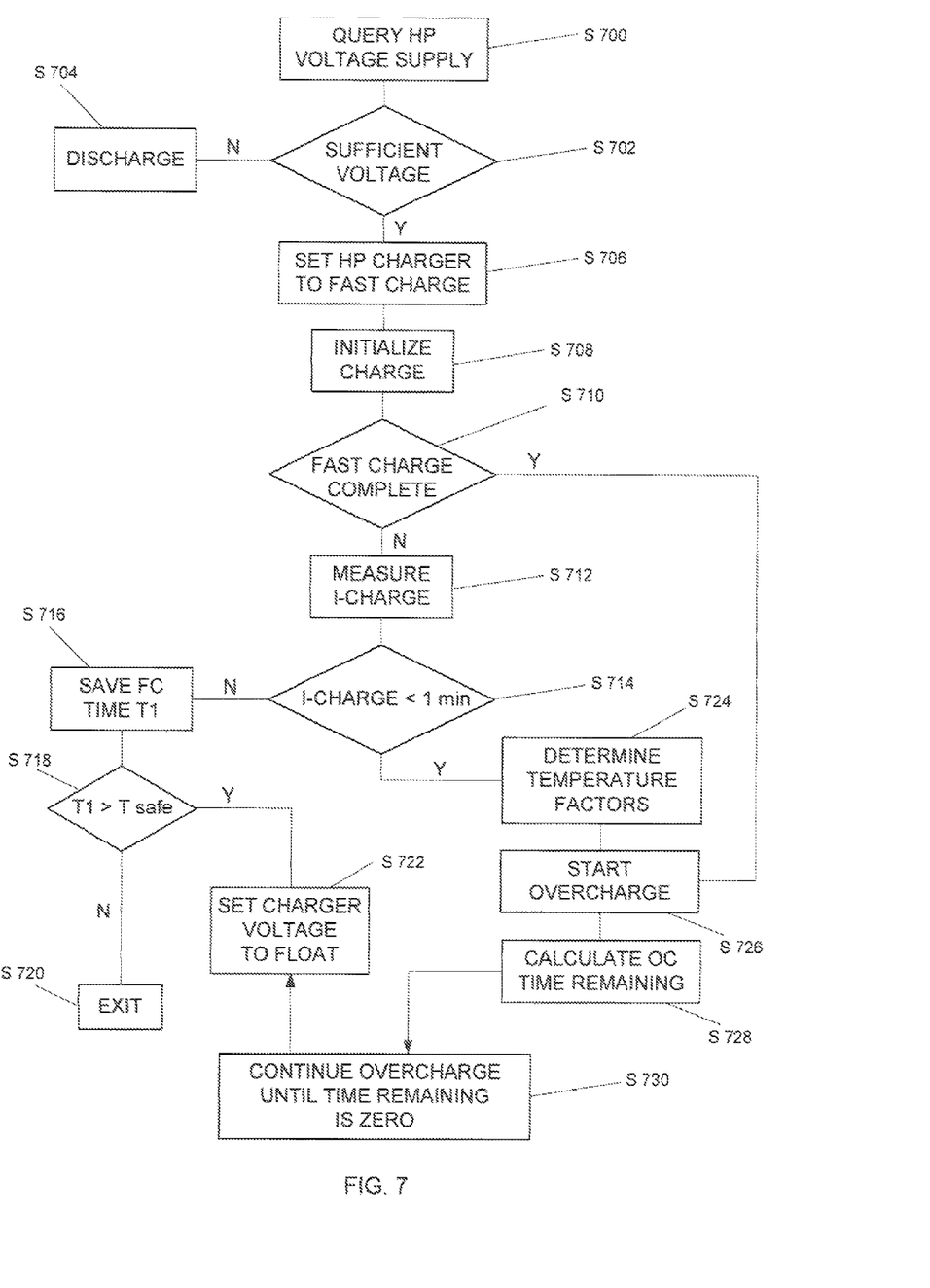
FIG. 7 is a flow chart depicting a method for charging a rechargeable battery using a high power charger in accordance with another variation of the preferred embodiment of the present invention.

An example method of charging the battery using the high power charger is shown in the flow chart of FIG. 7. In step S 700, the example method recites querying the high power voltage supply. As previously noted, a suitable high power voltage value is one the order of 9V, or approximately greater than or equal to 9.37V. In decision block S 702, if the voltage supply is insufficient then the example method proceeds to a discharge step in step S 704. If the voltage supply is sufficient, then the example method proceeds to set the high power charger to a fast charge state in step S 706. In step S 708, the fast charge is initialized, causing the high power charger to begin charging the battery.

In decision block S 710, the example method queries whether the fast charge state is complete. If the fast charge is complete, then the example method proceeds to step S 726 in which an overcharge state is entered by setting an overcharge voltage to supply the battery with an appropriate current. In step S 728, the example method recites calculating a time remaining, for the overcharge state, and in step S 730 the overcharge is continued until the overcharge time remaining is zero. Once the overcharge is complete, the example method sets the high power charger to a float charge state in step S 722.

If, in decision block S 710, the example method determines that the fast charge is not complete, then the example method proceeds to step S 712 in which the charge current is measured. If the charge current is less than a minimum current value, then the fast charge is complete and the example method proceeds to step S 716, discussed below. If the charge current is greater than the minimum current value, then the fast charge is not complete, then the example method proceeds to step S 724. In step S 724, the example method determines a set of temperature factors for determining the overcharge time remaining in step S 728. The overcharge time is calculated as the product of the time spent in the fast charge state and a temperature factor. For example, if the temperature is greater than −10 degrees Celsius, then the temperature factor can be 0.5, which sets die overcharge time remaining half of the value of the time already spent in the fast charge state. If the temperature is not greater than −10 degrees Celsius, then the temperature factor can be 0.7, thus effectively increasing the overcharge time by approximately forty percent due to the relatively low temperature. In any event, the example method can employ additional means or steps for ensuring that the overcharge time does not exceed two hours. Once the overcharge state is begun in step S 726, then the timer that is adapted to time the prior fast charge state is reset.

Returning to decision block S 714, if the charge current is not less than the minimum, current value, then the example method proceeds to step S 716, in which the fast charge time is saved as T1. As noted above, the fast charge time can be used in the example method for determining the remaining overcharge time in step S 728. In decision step S 718, the example method queries whether the fast charge time T1 exceeds a predetermined time that sets an upper bound on the time that the high power charger should be in the fast charge state. For instance, the predetermined time can be set to a value of five hours, in which case if the fast charge time T1 is greater than five hours, then the example method proceeds to set the high power charger to a float charge state in step S 722. If the fast charge time T1 is not greater than five hours, but the fast charge is nonetheless complete, then the example method terminates in step S 720.

Figure 8:
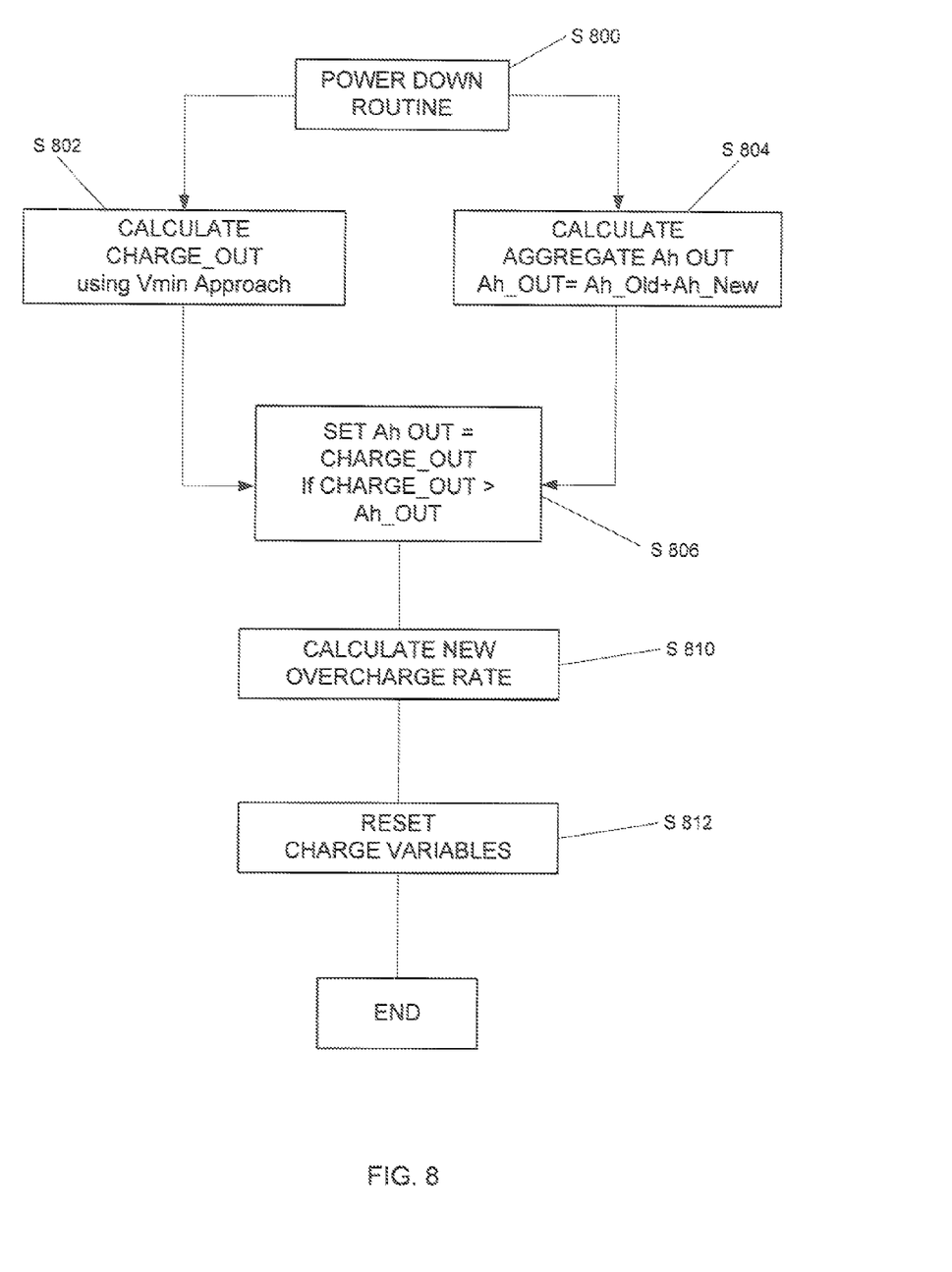
FIG. 8 is a flow chart depicting a method for estimating the discharge of a rechargeable battery in accordance with another variation of the preferred embodiment of the present invention.

Both the high power and low power charging methods exemplified above can be terminated by entering a power down routine which occurs when there is insufficient input power to either the low power or high power charger. An example of the power down routine is shown in the flowchart of FIG. 8. The power down routine functions to compile the charging history of the battery and to determine new rates for the next charging routine, which can be either a new high power or low power routine. Beginning in step S 800, the example method of FIG. 8 proceeds to step S 802, in which the battery capacity CHARGE_OUT is calculated. In one variation of the example method, the battery capacity can be calculated as a function of the minimum battery voltage and a temperature factor, the latter of which can he saved. As different types of batteries can have different charge ratings depending on the temperature, the battery capacity of any particular battery can then be calculated using a look-up table that factors in the charge percentage remaining in the battery and a temperature factor for that type of battery. The battery capacity is generally related to the previous charge output of the battery, i.e. the charge out is equal to the rated capacity of the battery less the battery capacity (determined in part through the temperature rating discussed above).

In step S 804 of the example method, the aggregate amp-hours-out of the battery is calculated for the one or more peripherals. The aggregate amp-hours-out can also be accumulated for more than one time period in which the battery is in a discharge state, in which case the aggregate amp-hours-out can be calculated as the sum of a previous/last amp-hours-out and the new-amp-hours out measured while in the low power charger state or the discharge state. The example method then proceeds to step S 806, in which the amp-hours-out is set to the larger of the CHARGE_OUT or current amp-hour-out variables.

In step S 810, the example method calculates a new overcharge rate as a function of the newest measurement for the amp-hours-out and an overcharge factor. In one variation of the example embodiment, the overcharge rate is set equal to the product of the overcharge factor and an amp-hours rating for the battery. For example, if the amp hours are set to a value of 4.5 Ah and the overcharge factor is set to 0.1, then the overcharge rate will be 0.45, which is the factor by which the system and methods of the present invention determine the overcharge rate relative to the fast charge rate. In step S 812, the charge variables are reset to a predetermined value, such as zero. Some example charge variables include a fast charge amp-hours-in, an overcharge amp-hours-in, a charge-out for the battery and a battery capacity. By resetting the appropriate charge variables, the example method insures that when the next-charging process begins, the best available charging parameters will be used in order to avoid accidental under- or overcharging of the batten.

The present invention as described herein can be embodied in a number of ways and utilized in a number of environments. Those of skill in the art would understand that information and signals may he represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal, which can include for example a vehicular charging system of the type described above. In the alternative, the processor and the storage medium may reside as discrete components in a user terminal.

The previous description of the preferred and example embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein hut is to be accorded the widest scope consistent with the principles and novel features disclosed herein.

We claim:

1. A method for charging a rechargeable battery through one of a high power source or a low power source, the method comprising:
    causing a high power charger to charge the battery in response to a corresponding high power input voltage from the high power source comprising a sufficient high power input voltage;
    causing a low power charger to charge the battery in response to an insufficient high power input voltage and a corresponding low power input voltage from the low power source comprising a sufficient low power input voltage;
    accumulating the amp-hours-out of the battery for more than one time period in which the battery is in a discharge state, including a previous amp-hours-out corresponding to a first time period and a new amp-hours-out corresponding to a second time period:
    calculating the aggregate of the amp-hours-out of the battery as a sum of the previous amp-hours-out and the new amp-hours-out;
    determining a battery capacity based on the aggregate of an amp-hours-out from the battery;
    determining a fast charge required based on the battery capacity, wherein the fast charge is at a higher voltage relative to a normal charge; and
    wherein causing the low power charger to charge the battery further comprises setting the low power charger to a fast charge state to provide the fast charge required.

2. The method of claim 1, further comprising causing the low power charger to charge the battery in response to the high power source being disconnected from the battery during a charging phase, such that the low power charger resumes charging the battery from an intermediate charge state of the battery.

3. The method of claim 1, wherein causing the high power charger to charge the battery further comprises causing the high power charger to charge the battery according to a high power algorithm.

4. The method of claim 3, wherein the high power algorithm comprises:
    setting the high power charger to a high power fast charge state;
    ending the high power fast charge state in response to a charger current value being less than a minimum current value;
    setting the high power charger to an overcharge state in response to the charger current value decreasing below the minimum current value; and
    setting the high power charger to a float charge state in response to ending the overcharge state or exceeding a maximum time allowed for the high power fast charge state.

5. The method of claim 1, wherein causing the low power charger to charge the battery further comprises causing the low power charger to charge the battery according to a low power algorithm.

6. The method of claim 5, wherein the low power algorithm comprises:
    determining a charge rate of the fast charge required in response to a previous charging routine; and
    ending the fast charge state in response to the aggregate of the amp-hours-out of the battery being replaced by an amp-hours-in provided by the low power charger.

7. The method of claim 6, wherein the aggregate of the amp-hours-out of the battery comprises an aggregate of amp-hours provided by the battery to one or more peripherals.

8. The method of claim 7, wherein the aggregate of the amp-hours-out of the battery further comprises a prior aggregation of amp-hours provided by the battery to the one or more peripherals.

9. The method of claim 1, further comprising:
    discharging the battery in response to a transition between causing the high power charger to charge the battery and causing the low power charger to charge the battery.

10. The method of claim 1, further comprising:
    measuring a peak minimum voltage of the battery; and
    wherein determining the battery capacity is further based on the peak minimum voltage of the battery.

11. The method of claim 1, wherein determining the battery capacity is further based on a temperature of the battery.

12. The method of claim 1, further comprising:
    terminating charging of the battery by the high power charger or the low power charger;
    compiling a charging history of the battery in response to terminating the charging of the battery; and
    determining a new charging rate for a next charging of the battery based on the charging history.

13. The method of claim 12, further comprising:
calculating a charge out value as a function of a minimum battery voltage and a temperature of the battery;
wherein compiling the charging history of the battery further comprises determining a calculated aggregate of the amp-hours-out of the battery; and
resetting a value of the aggregate of the amp-hours-out of the battery to the charge out value if the charge out value is larger than the calculated aggregate of the amp-hours-out of the battery.

14. A system for charging a battery, comprising:
a high power charger connected to a high power source defining a high power input voltage for charging a battery;
a low power charger connected to a low power source defining a low power input voltage for charging the battery; and
a processor connected to the high power charger and the low power charger, the processor adapted to accumulate the amp-hours-out of the battery for more than one time period in which the battery is in a discharge state, including a previous amp-hours-out corresponding to a first time period and a new amp-hours-out corresponding to a second time period, calculate the aggregate of the amp-hours-out of the battery as a sum of the previous amp-hours-out and the new amp-hours-out, control the high power charger to charge the battery in response to the high power input voltage comprising a sufficient high power input voltage, wherein the processor is adapted to control the low power charger to charge the battery in response to the high power input voltage comprising an insufficient high power input voltage and the low power input voltage comprising a sufficient low power input voltage;
wherein the processor is further adapted to determine a battery capacity based on the aggregate of an amp-hours-out from the battery, and to determine a fast charge required based on the battery capacity, wherein the fast charge is at a higher voltage relative to a normal charge; and
wherein the processor is further adapted to set the low power charger to a fast charge state to provide the fast charge required when selecting the low power charger to charge the battery.

15. The system of claim 14, wherein the processor is further adapted to control the low power charger to charge the battery in response to the high power source being disconnected from the battery during a charging phase, such that the low power charger resumes charging the battery from an intermediate charge state of the battery.

16. The system of claim 14, wherein the processor is further adapted to control the high power charger to charge the battery according to a high power algorithm.

17. The system of claim 16, wherein the high power algorithm includes:
setting the high power charger to a high power fast charge state;
ending the high power fast charge state in response to a charger current value being less than a minimum current value;
setting the high power charger to an overcharge state in response to the charger current value decreasing below the minimum current value; and
setting the high power charger to a float charge state in response to one of ending the high power fast charge state or the overcharge state.

18. The system of claim 14, wherein the processor is further adapted to control the low power charger to charge the battery according to a low power algorithm.

19. The system of claim 18, wherein the low power algorithm includes:
determining a charge rate of the fast charge required in response to a previous charging routine; and
ending the fast charge state in response to the aggregate of the amp-hours-out of the battery being replaced by an amp-hours-in provided by the low power charger.

20. The system of claim 19, wherein the aggregate of the amp-hours-out of the battery comprises an aggregate of amp-hours provided by the battery to one or more peripherals.

21. The system of claim 20, wherein the aggregate of the amp-hours-out of the battery further comprises a prior aggregation of amp-hours provided by the battery to the one or more peripherals.

22. The system of claim 14, wherein the processor is further adapted to transition through a discharge state in response to a transition between controlling the high power charger to charge the battery and controlling the low power charger to charge the battery.

23. A computer program product, comprising:
a non-transitory computer-readable medium comprising:
code for causing a processor to control a high power charger to charge a battery in response to a corresponding high power input voltage comprising a sufficient high power input voltage;
code for causing the processor to control a low power charger to charge the battery in response to the high power input voltage comprising an insufficient high power input voltage and a corresponding low power input voltage comprising a sufficient low power input voltage;
code for causing the processor to accumulate the amp-hours-out of the battery for more than one time period in which the battery is in a discharge state, including a previous amp-hours-out corresponding to a first time period and a new amp-hours-out corresponding to a second time period;
code for causing the processor to calculate the aggregate of the amp-hours-out of the battery as a sum of the previous amp-hours-out and the new amp-hours-out;
code for causing the processor to determine a battery capacity based on an aggregate of the amp-hours-out from the battery;
code for causing the processor to determine a fast charge required based on the battery capacity, wherein the fast charge is at a higher voltage relative to a normal charge; and
code for causing the processor to set the low power charger to a fast charge state to provide the fast charge required when selecting the low power charger to charge the battery.

24. The product of claim 23, wherein the non-transitory computer-readable medium further comprises code for causing the processor to control the low power charger to charge the battery in response to the high power source being disconnected from the battery during a charging phase, such that the low power charger resumes charging the battery from an intermediate charge state of the battery.

25. The product of claim 23, wherein the non-transitory computer-readable medium further comprises code for causing the processor to control the high power charger to charge the battery according to a high power algorithm.

26. The product of claim 25, wherein the high power algorithm includes:

setting the high power charger to a high power fast charge state;

ending the high power fast charge state in response to a charger current value being less than a minimum current value;

setting the high power charger to an overcharge state in response to the charger current value decreasing below the minimum current value; and setting the high power charger to a float charge state in response to one of ending the high power fast charge state or the overcharge state.

27. The product of claim 23, wherein the non-transitory computer-readable medium further comprises code for causing the processor to control the low power charger to charge the battery according to a low power algorithm.

28. The product of claim 27, wherein the low power algorithm includes:

determining a charge rate of the fast charge required in response to a previous charging routine; and ending the fast charge state in response to the aggregate of the amp-hours-out of the battery being replaced by an amp-hours-in provided by the low power charger.

29. The product of claim 28, wherein the aggregate of the amp-hours-out of the battery comprises an aggregate of amp-hours provided by the battery to one or more peripherals.

30. The product of claim 29, wherein the aggregate of the amp-hours-out of the battery further comprises a prior aggregation of amp-hours provided by the battery to the one or more peripherals.

31. The product of claim 29, wherein the non-transitory computer-readable medium further comprises code for causing the processor to discharge the battery in response to a transition between controlling the high power charger to charge the battery and controlling the low power charger to charge the battery.

32. An apparatus for charging a rechargeable battery through one of a high power source or a low power source, comprising:

means for causing a high power charger to charge the battery in response to a sufficient high power input voltage from the high power source;

means for causing a low power charger to charge the battery in response to an insufficient high power input voltage from the high power source and a sufficient low power input voltage from the low power source;

means for accumulating the amp-hours-out of the battery for more than one time period in which the battery is in a discharge state, including a previous amp-hours-out corresponding to a first time period and a new amp-hours-out corresponding to a second time period;

means for calculating the aggregate of the amp-hours-out of the battery as a sum of the previous amp-hours-out and the new amp-hours-out;

means for determining a battery capacity based on an aggregate of an amp-hours-out from the battery;

means for determining a fast charge required based on the battery capacity, wherein the fast charge is at a higher voltage relative to a normal charge; and wherein the means for causing the low power charger to charge the battery further comprises means for setting the low power charger to a fast charge state to provide the fast charge required.

* * * * *